US010729077B2

(12) United States Patent
Bahler et al.

(10) Patent No.: US 10,729,077 B2
(45) Date of Patent: Aug. 4, 2020

(54) EDGING MEMBER, SYSTEM, AND ARRANGEMENT FOR LANDSCAPING OR PAVING

(71) Applicant: TOOLBRO INNOVATORS, LLC, Ellington, CT (US)

(72) Inventors: Philip J. Bahler, Ellington, CT (US); Kent R. Bahler, Ellington, CT (US)

(73) Assignee: TOOLBRO INNOVATORS, LLC, Ellington, CT (US)

( * ) Notice: Subject to any disclaimer, the term of this patent is extended or adjusted under 35 U.S.C. 154(b) by 0 days.

(21) Appl. No.: 16/141,438

(22) Filed: Sep. 25, 2018

(65) Prior Publication Data

US 2019/0327915 A1 Oct. 31, 2019

Related U.S. Application Data

(63) Continuation-in-part of application No. 15/965,133, filed on Apr. 27, 2018, now Pat. No. 10,398,093.

(60) Provisional application No. 62/763,598, filed on Jun. 22, 2018.

(51) Int. Cl.
*A01G 9/28* (2018.01)
*E01C 19/50* (2006.01)

(52) U.S. Cl.
CPC .............. *A01G 9/28* (2018.02); *E01C 19/502* (2013.01)

(58) Field of Classification Search
CPC .................................. A01G 9/28; E01C 19/502
USPC ................................ 52/102; 47/33; D25/164
See application file for complete search history.

(56) References Cited

U.S. PATENT DOCUMENTS

| 3,037,433 A * | 6/1962 | Maher ..................... E01F 9/541 404/7 |
| 5,092,076 A * | 3/1992 | Terreta ..................... A01G 9/28 47/33 |
| 5,212,917 A * | 5/1993 | Kurtz ....................... A01G 9/28 52/102 |
| 5,240,343 A * | 8/1993 | Strobl, Jr. ............. E01C 11/221 404/7 |
| 5,283,994 A * | 2/1994 | Callison .................. E02D 17/20 404/7 |
| 5,301,461 A * | 4/1994 | Zwier ...................... A01G 9/28 47/33 |
| 5,442,877 A * | 8/1995 | Lindhal .................... A01G 9/28 47/33 |
| 5,640,801 A * | 6/1997 | Rynberk .................. A01G 9/28 47/33 |
| 6,030,144 A | 2/2000 | Cannella |
| 6,071,038 A * | 6/2000 | Strobl, Jr. ............. E01C 11/221 404/7 |

(Continued)

FOREIGN PATENT DOCUMENTS

| DE | 102010034600 A1 * | 2/2012 | ............ E01C 11/222 |
| EP | 1430768 A1 * | 6/2004 | ............ A01G 25/02 |

(Continued)

*Primary Examiner* — Michael Safavi
(74) *Attorney, Agent, or Firm* — Ira S. Dorman (57) ABSTRACT

Edging members for retaining or restraining installations of pavers, landscaping, and covering materials are constructed for endwise, longitudinal assembly with one another, and to receive stakes of generally V-shaped or generally U-shaped cross section, and spikes driven at angled orientations, for securing the members, on a substrate, against lateral and upward displacement.

18 Claims, 9 Drawing Sheets

(56) References Cited

U.S. PATENT DOCUMENTS

| | | | | |
|---|---|---|---|---|
| 6,085,458 | A * | 7/2000 | Gau | A01G 9/28 47/33 |
| 6,099,201 | A * | 8/2000 | Abbrancati | A01G 9/28 404/7 |
| 6,230,451 | B1 * | 5/2001 | Stoller | A63C 19/10 220/9.4 |
| 6,379,078 | B1 * | 4/2002 | Zwier | E01C 11/08 404/7 |
| 6,409,421 | B1 * | 6/2002 | Jones | A01G 9/28 404/7 |
| 6,668,484 | B2 | 12/2003 | Riccobene | |
| 6,767,159 | B2 * | 7/2004 | Jones | A01G 9/28 404/7 |
| 7,195,421 | B2 * | 3/2007 | Dunbar | E01C 11/221 404/7 |
| 7,774,993 | B2 * | 8/2010 | Strobl, Jr. | A01G 9/28 52/102 |
| 7,967,524 | B2 | 6/2011 | Jones | |
| 8,915,027 | B1 * | 12/2014 | Alfieri, III | A01G 9/28 52/102 |
| 2008/0163566 | A1 * | 7/2008 | Bella | A01G 9/28 52/102 |
| 2009/0038238 | A1 * | 2/2009 | Kurtz | A01G 9/28 52/102 |
| 2010/0186293 | A1 * | 7/2010 | Flynn | A01G 9/28 47/33 |
| 2010/0293871 | A1 | 11/2010 | Strobl, Jr. et al. | |
| 2019/0174685 | A1 * | 6/2019 | Wang | F16M 11/22 |

FOREIGN PATENT DOCUMENTS

| | | | | |
|---|---|---|---|---|
| GB | 191114174 A | * | 6/1912 | A01G 9/28 |
| KR | 20180047964 | * | 5/2018 | A01G 9/28 |
| WO | WO-2005055701 A1 | * | 6/2005 | A01G 9/28 |

* cited by examiner

FIG. 11

EDGING MEMBER, SYSTEM, AND ARRANGEMENT FOR LANDSCAPING OR PAVING

CROSS-REFERENCE TO RELATED APPLICATIONS

This application is a Continuation-in-Part of U.S. application Ser. No. 15/965,133, filed Apr. 27, 2018 and entitled "STAKE AND ASSEMBLY INCLUDING IT" which is in turn a Continuation-in-Part of U.S. Design Pat. Application No. 29/632,005, filed Jan. 4, 2018 and entitled "STAKE." This application claims the benefit of U.S. Provisional Application No. 62/763,598, filed Jun. 22, 2018 and entitled "EDGING SYSTEM."

The disclosures of the foregoing applications are incorporated hereinto by reference.

BACKGROUND OF THE INVENTION

Arrangements comprised of edging members and systems are in widespread use for the retention and restraint of landscaping or covering materials, pavers, and the like, deposited or laid upon the ground, a prepared base, or other substrates.

Such restraint and retention arrangements are described in the prior art. For example, U.S. Pat. No. 5,240,303 provides a structure for holding paving blocks, which structure is secured by driving nails through it into the ground. U.S. Pat. No. 7,774,993 provides an elongated landscape-retaining or edging strip that is held in place by spikes, driven into the ground, for retention and/or separation of beds of earth or other landscaping fill (i.e., gravel, rock, bark, dirt, sand, mulch) or the retention and maintenance of paving materials (i.e., bricks, paving stones, rock, gravel, etc.).

As is emphasized in both of the above-identified patents, the natural freezing and thawing cycle of the ground (and other permeable outdoor substrates), as well as vehicular and pedestrian traffic, causes movement of deposited landscaping and paving materials. Also recognized therein it the tendency of nails and spikes used for securing edging members to come loose and pull up out of the ground. Lateral displacement of the ground-engaging fasteners, for which there is a particular tendency with packed clear or open stone substrates, does not appear to have been recognized or addressed.

BRIEF SUMMARY OF THE INVENTION

Accordingly, it is the broad object of the present invention to provide a novel edging member, system, and arrangement for retaining or restraining installations of landscaping, covering, paving materials, and the like.

A more specific object of the invention is to provide such a system and arrangement comprised of one or a plurality of edging members, respectively, and a multiplicity of substrate-engaging holding or fastening members for securement of the edging member or members against both vertical and lateral displacement.

Further objects of the invention are to provide such a system and arrangement which are relatively facile to install and highly effective for their intended use.

It has now been found that certain of the foregoing and related objects of the invention are attained by the provision of an edging system for use in an arrangement for retaining or restraining a landscaping, covering, or paving material against upward and lateral displacement. Objects of the invention are also attained by the provision of an edging member, of which the edging system is comprised, and by the provision of an arrangement comprised of a plurality of the edging systems described.

More particularly, the edging system of the invention includes an elongate edging member comprised of a generally planar base wall having opposite longitudinal edges, and a lateral wall that extends upwardly along one of the lateral edges of the base wall along substantially its entire length; and a multiplicity of holding members for cooperatively securing the edging member upon a substrate underlying the base wall of the edging member. The base wall of the edging member has a plurality of bore-defining structures defining a multiplicity of angularly oriented bores through the base wall at spaced locations along the length of the edging member. The bores have effective axes that lie substantially in at least one plane that is perpendicular to the plane of the base wall and between the lateral edges thereof, and at an acute angle to the plane of the base wall, the acute angle of the axes of a first plurality of the bores being taken in a first arcuate direction relative to the plane of the base wall and the acute angle of the axes of a second plurality of the bores being taken in a second arcuate direction, opposite to the first arcuate direction, relative to the plane of the base wall. The acute angle of the bore axes will normally have a value of about 45° to 75°, and most desirably the value will be about 60°.

In preferred embodiments, the base wall of the edging member has a plurality of generally V-shaped or generally U-shaped apertures therethrough, at spaced locations along the length of the member. The V-shaped apertures will usually be comprised of two rectilinear slots that converge to or toward a vertex; and will usually be oriented with their vertices proximate one of the lateral edges of the base wall. The U-shaped apertures will usually be comprised of two rectilinear slots that are parallel to one another and are joined, at one end, by a semicircular slot element, and comparably oriented in the base wall.

A first plurality of the holding members will comprise spikes that are dimensioned and configured for being driven individually through the bores of the bore-defining structures into the substrate underlying the edging member, and to engage the bore-defining structures for cooperatively securing the edging member in place upon the substrate.

A second plurality of the holding members will comprise stakes of generally V-shaped or U-shaped cross section that are dimensioned and configured to be driven through correspondingly shaped apertures of the base wall into an underlying substrate, and to engage portions of the base wall that define the apertures, for cooperatively securing the edging member in place on the substrate.

The edging member will normally be of right angular cross section, and the lateral wall will normally be generally planar. The effective axes of the first plurality of the bores will preferably lie substantially on a first plane that is perpendicular to the plane of the base wall and between the lateral edges thereof, with the effective axes of the second plurality of bores lying substantially on a second plane, offset laterally from the first plane, that is also perpendicular to the plane of the base wall and between the lateral edges thereof.

The slot elements of the generally V-shaped apertures will usually be disposed at an internal angle of about 45° to 135°, and preferably 90° to one another, and vertices of the V-shaped apertures (or at least some of them) will most desirably lie proximate the lateral wall of the edging member.

The stakes employed in the system of the invention are constructed for being driven lengthwise through correspondingly generally V-shaped or generally U-shaped apertures in the base wall of the edging member. Each of the preferred generally V-shaped stakes has a top, a bottom, and opposite lateral edges extending substantially along its entire length, and will desirably comprise two generally planar panels joined to one another along a common rectilinear longitudinal axis, the panels being disposed with an internal angle that is substantially the same as the angle between slot elements of the V-shaped apertures through the base wall of the edging member. Each panel provides one of the opposite lateral edges on the stake, which edges converge, at least along a lower portion of the stake, to form a tip on the common longitudinal axis at the bottom, and each stake will usually be substantially symmetrical about its longitudinal axis.

More particularly, each panel comprising a generally V-shaped stake will most desirably have a flange portion at the top, spaced from the longitudinal axis, with the flange portions extending inwardly of the stake and being disposed substantially in a common plane that is generally perpendicular to the planes of the panels. Also, the panels will desirably cooperatively form a tang portion at the top of the stake, on the longitudinal axis, extending upwardly beyond the flange portions.

The stakes constructed for being driven through the U-shaped apertures will also preferably be comprised of generally planar panels, which will however be substantially parallel to one another. U-shaped stakes will desirably have flange and tang portions, similar to those present on the V-shaped stakes.

In the system of the invention, the edging member has first and second opposite end portions, the first opposite end portion preferably having first coupling means thereon and the second opposite end portion preferably having second coupling means thereon that is structurally complimentary to the first coupling means. The first coupling means is constructed to mate with and secure second coupling means on a separate, endwise-arranged edging member of like construction, and the second coupling means is constructed, correspondingly, to mate with and be secured by a first coupling means on a separate, endwise-arranged edging member of like construction. Thus, the edging member of the system can be assembled with and secured to a separate, like edging member in an endwise relationship.

The coupling means on one of the end portions of the edging member will advantageously comprise the bore-defining structure described. Particularly when the edging member is fabricated from a synthetic resinous material, the coupling means on the other end portion will preferably comprise a socket that is constructed to engage the bore-defining structure of an assembled separate edging member, desirably in a snap-fit relationship.

Alternatively, and particularly when the edging member is fabricated from a metal and the bore-defining structures comprise areas or tabs upwardly deformed from the base wall, the system may additionally include a coupling piece constructed to engage separately the bore-defining structure on each of the opposite end portions of the edging member. The coupling piece can thereby secure the edging member to a separate, endwise-arranged edging member of like construction.

The arrangement of the invention comprises a plurality of the elongate edging members described, arranged and secured in endwise relationship to one another, utilizing the coupling and holding means and members, also described.

DETAILED DESCRIPTION OF THE INVENTION

Figure 1:
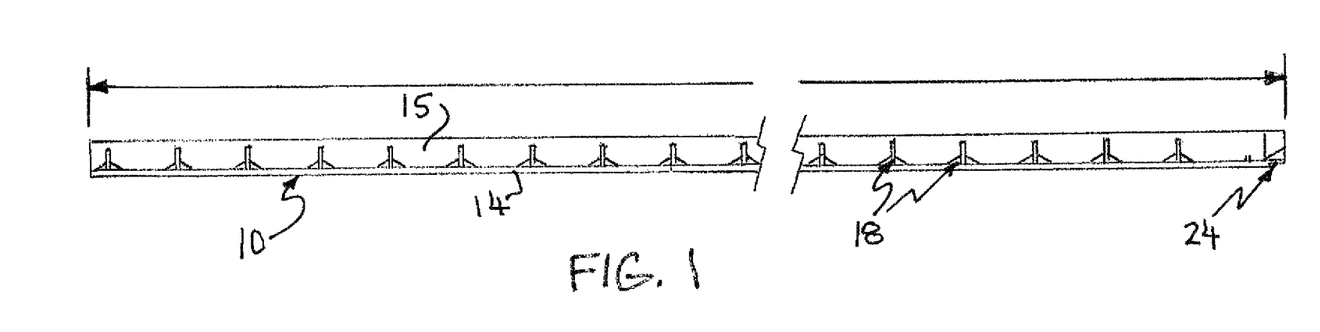
FIG. 1 is a fragmentary elevational view of an edging member comprising a first embodiment of the present invention, drawn to a very small scale.
Figure 2:
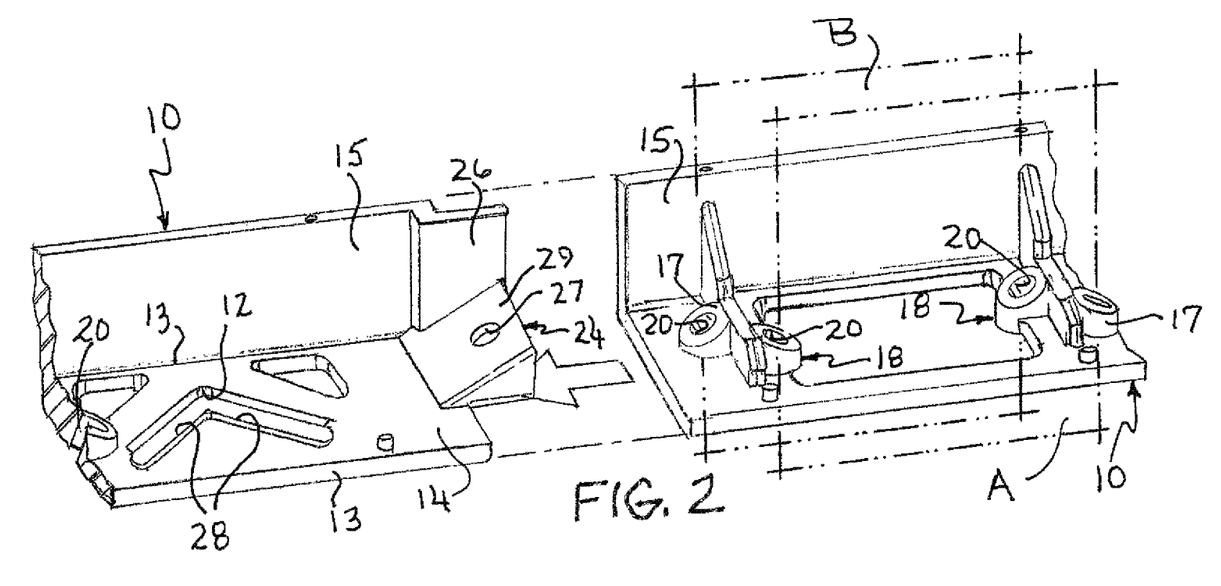
FIG. 2 is a fragmentary orthographic view, drawn to an enlarged scale, of opposite end portions of two of the edging members of FIG. 1 in the process of being joined endwise to one another.
Figure 3:
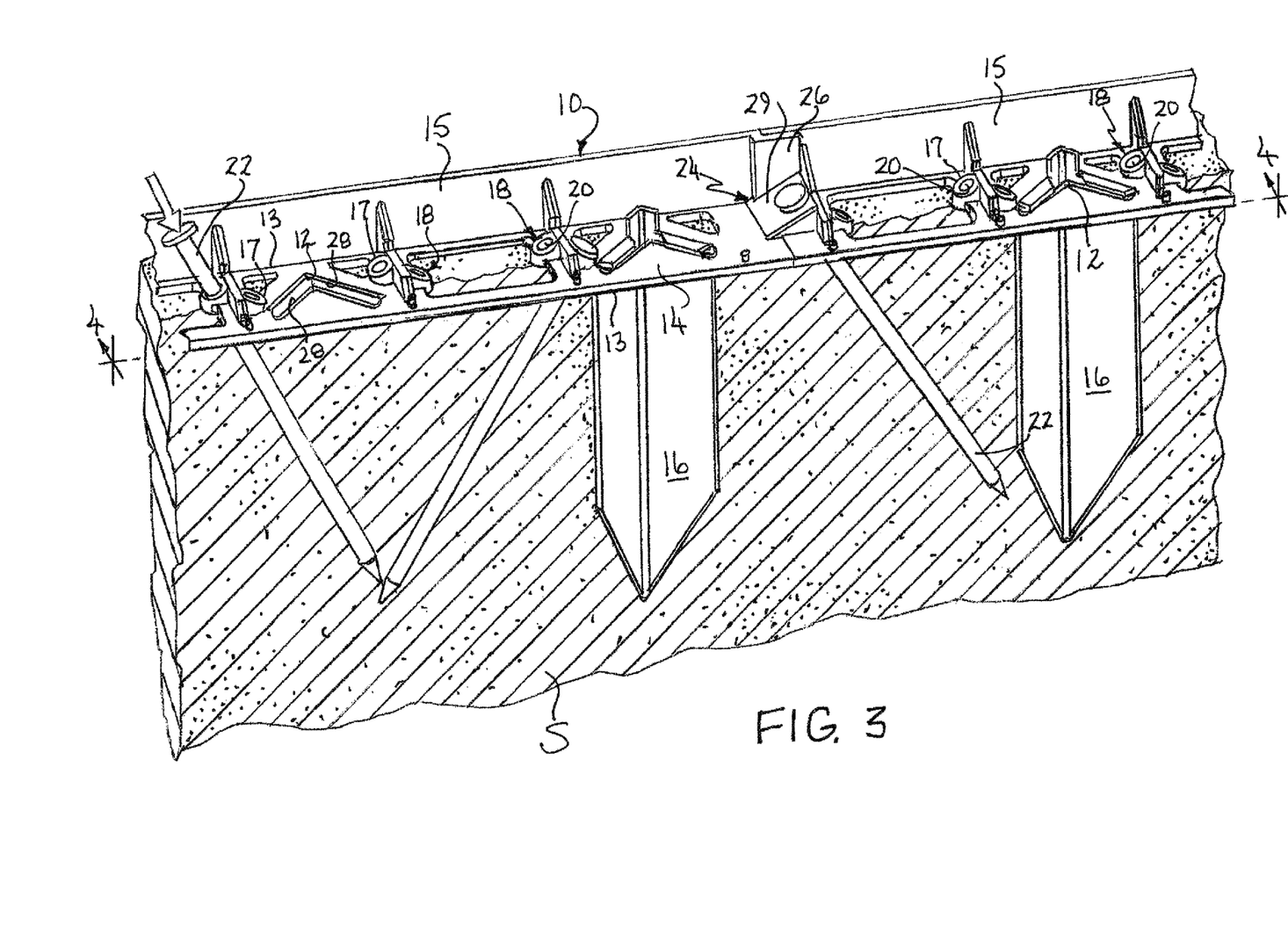
FIG. 3 is an orthographic view of an arrangement of two edging systems embodying the invention, joined end-to-end and secured to a substrate by stakes and spikes and fastened to one another by one of the spikes, each system being comprised an edging member illustrated in FIGS. 1 and 2.

Turning now in detail to FIGS. 1 through 6 of the drawings, an edging member embodying the present invention, generally designated by the numeral 10, is illustrated in FIG. 1. FIG. 2 shows two edging members 10 being assembled in endwise relationship, and FIG. 3 shows the members in such end-to-end assembly; a left end portion of one of the members 10 is joined to a right end portion of the other member 10.

The (normally horizontal, as installed) base wall 14 of each member 10 has longitudinally extending lateral edges 13 and a multiplicity of V-shaped apertures 12 extending therethrough at longitudinally spaced locations; for convenience of illustration only one such aperture 12 is shown in FIG. 2 and only three are shown in FIG. 3. Each aperture 12 consists of two slot elements 28, disposed at an angle of 90° to one another and joined at a vertex proximate the upstanding (normally vertical) lateral wall 15. As seen in FIG. 3, the apertures 12 receive stakes, generally designated by the numeral 16, of corresponding right-angular transverse cross section (thus conforming thereto), which are driven into a substrate S (e.g., a bed of stone, gravel, aggregate or the like or, needless to say, simply the earth) to secure the members 10 against both lateral and vertical displacement, it being appreciated that not all apertures need receive stakes 16.

In addition, each member 10 has a multiplicity of upstanding boss formations, generally designated by the numeral 18, at locations spaced along the length of the base wall 14 and between the lateral edges 13. Each of two generally cylindrical elements 17 of the boss formations 18 defines a bore 20 extending therethrough. The bores 20 are laterally offset in the side-by-side boss formation elements 17, and extend with oppositely directed angular orientations, preferably of 60° to the plane of the base wall 14; the planes in which the effective axes of the bores extend, designated "A" and "B" in FIG. 2, are perpendicular to the plane of the base wall 14 and extend longitudinally between the lateral edges 13 thereof.

A spike 22 is driven into the substrate S through one of the bores 20 of a selected boss formation 18. As noted from FIG. 3, the spikes 22 are desirably driven through oppositely directed bores 20 in adjacent (or, if not adjacent, then longitudinally sequential) boss formations, and because the bores in any boss formation are mutually laterally offset the driven spikes do not interfere with one another in the substrate S. Particularly because of the non-perpendicular orientations of the effective axes of the bores 20 relative to the plane of the bottom wall 14, the spikes 22, received in the bores 20 and engaged with the boss formations 18, provide vertical force components and are therefore especially effective for enhancing the resistance of the members 10 to upward displacement due to forces generated in the substrate (e.g., by freeze-thaw effects).

Figure 5:
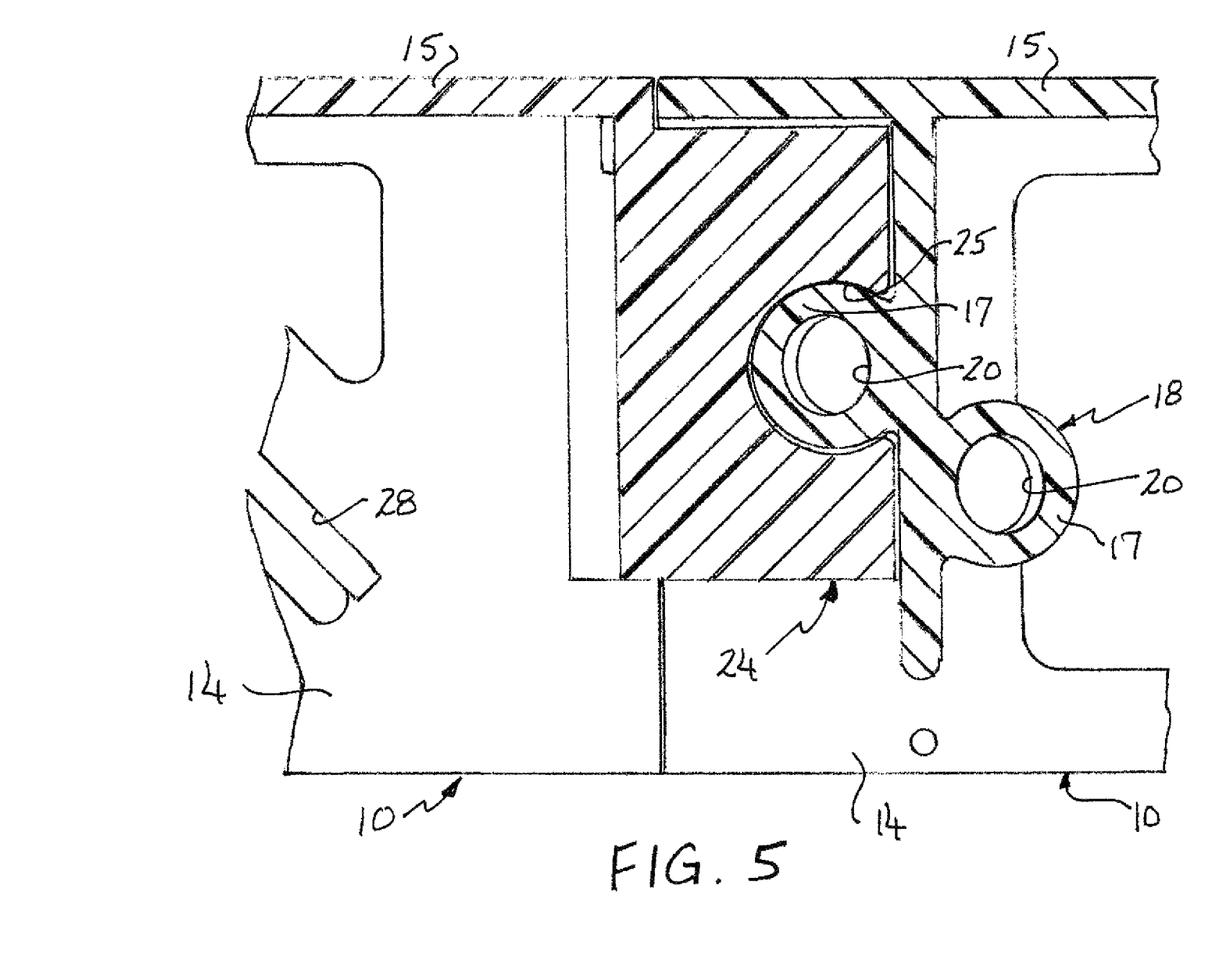
FIG. 5 is a sectional view, taken along line 5-5 in FIG. 4, showing the structure of the socket in the end portion of one of the edging members in which the received element of the boss structure on the opposite end portion of the other edging member is seated and engaged in a snap-fit relationship.

Coupling structure, generally designated by the numeral 24, is formed at one end of each edging member 10 (i.e., the right end of the left member, as illustrated), and is constructed to receive a generally cylindrical element 17 of the boss formation 18 on the end portion of an endwise-adjacent member 10 (i.e., the left end of the right member, as illustrated) inserted longitudinally thereinto (as indicated by the open arrow). As best seen in FIG. 5, a lower portion of the coupling structure 24 has a C-shaped recess 25, dimensioned to engage the inserted element 17 of a terminal boss formation 18 in a snap-fit relationship, to at least preliminarily assemble the members 10 with one another. This feature facilitates laying out of an arrangement of the edging systems, prior to more permanently securing the edging members 10 to the substrate.

Figure 4:
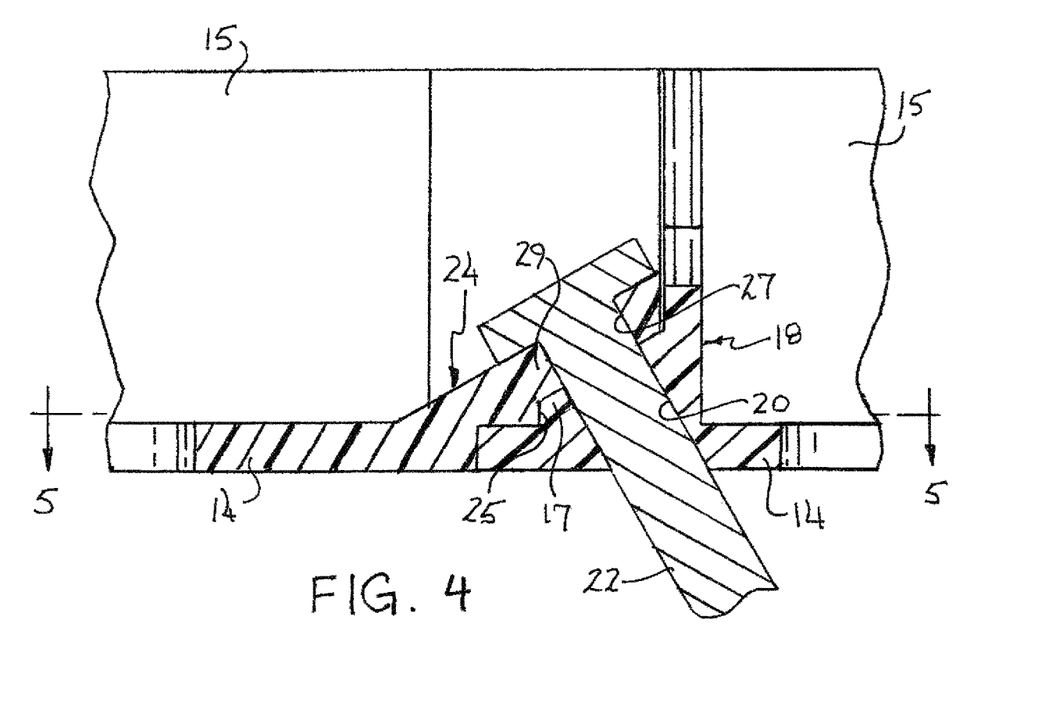
FIG. 4 is a fragmentary view, in partial section taken along line 4-4 in FIG. 3, and drawn to a further enlarged scale, showing a secured connection between the edging members depicted in FIG. 3.

As seen in FIG. 4, a spike 22 is driven through the hole 27 formed in the slanted upper wall 29 of the coupling structure 24 and through an aligned 60° bore 20 of the underlying, engaged boss element 17. The spike 22 thus serves both to more permanently secure the adjacent members 10 in endwise interengagement and also to cooperate with the stakes 16, and other spikes 22, for holding the edging system against the substrate S. It should be appreciated that, although either spikes or stakes can serve as the holding members in the system of the invention, maximum holding power and resistance to displacement of the edging members will be achieved by the use of holding members of both kinds, acting together. The stakes 16 and spikes 22 will normally be made from steel or aluminum.

An offsetting end portion 26 of the vertical wall 15 of each edging member 10 receives a corresponding plain end portion of the wall 15 of the adjacent member 10. The interfit end portions cause the assembled members 10 to present a substantially continuous outer face of the upstanding walls 15; they also help to maintain the walls 15 against separation due to outward lateral forces that may be generated by pavers, landscaping, etc. retained or restrained by the edging.

The edging members 10 will desirably be fabricated from a synthetic resinous material (e.g., recycled HDPE) to provide requisite rigidity coupled with sufficient flexibility to enable conformation to bends and contours of a retained mass of landscaping or the like. It will also be appreciated that elements and areas of the base wall may be severed and removed, as appropriate to facilitate desired bending.

Figure 6:
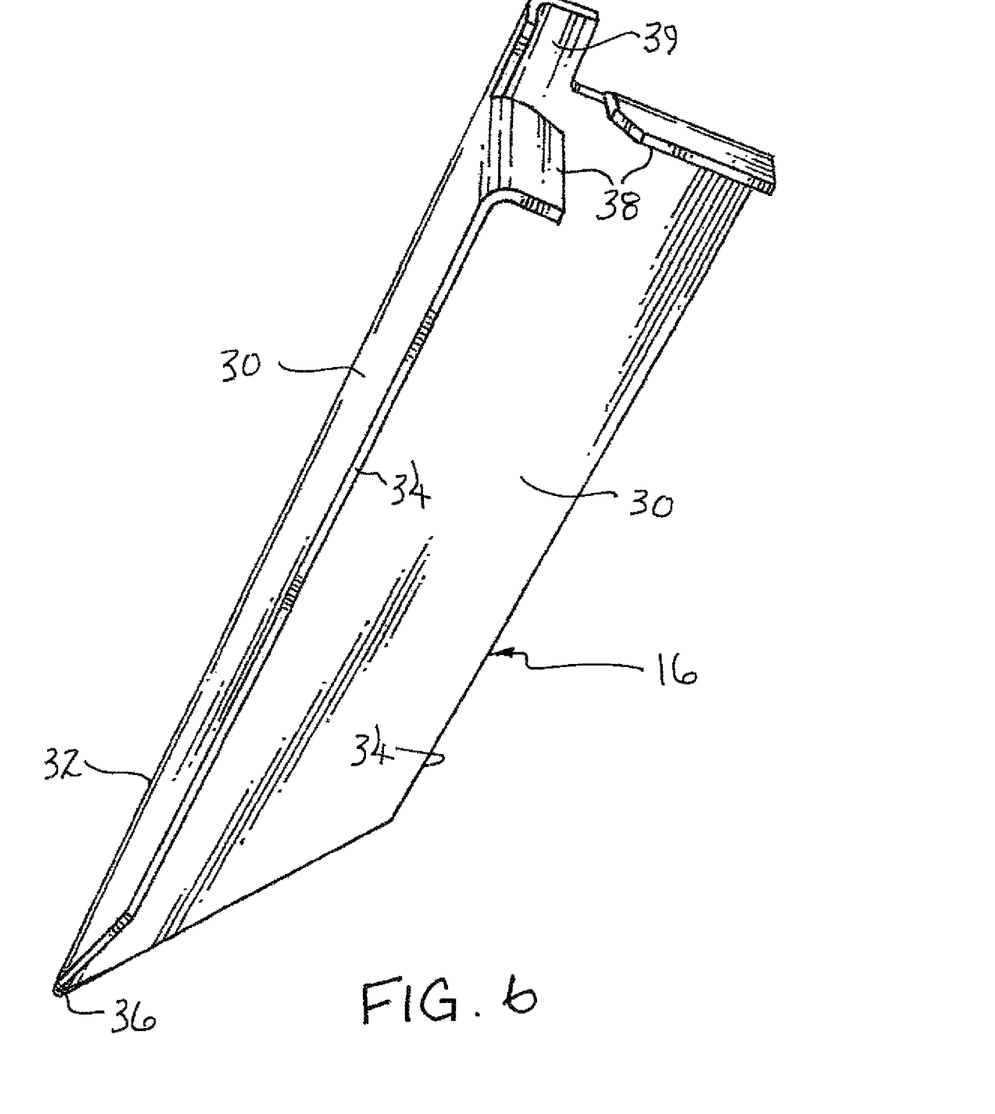
FIG. 6 is an orthographic view of a V-shaped stake suitable for use in a system embodying the present invention.

A preferred structure of the V-shaped stake 16 is most fully illustrated in FIG. 6. As can be seen, it is comprised of two generally planar panels 30 joined to one another along a common rectilinear longitudinal axis 32 and disposed with an internal angle corresponding to the angle (e.g., of 90°) between the slot elements 28 of the apertures 12 through the base wall 14 of the edging member 10. Each panel 30 provides an opposite lateral edge 34 of the stake 16 extending substantially along its entire length, with the lateral edges 34 converging to form a bottom tip 36 on the common longitudinal axis 32; as can be seen, the stake 16 is substantially symmetrical about that axis.

Each of the panels 30 comprising the stake 16 has a flange portion 38 at the top of the stake, spaced from the longitudinal axis 32. The flange portions 38 extend inwardly and are disposed substantially in a common plane that is generally perpendicular to the planes of the panels 30. The panels cooperatively form an axial tang portion 39 at the top of the stake and extending upwardly beyond the flange portions.

Although hand tools may be used, the stakes will advantageously be driven into the substrate by use of a power hammer, with the tang portion of the stake being received in an upwardly extending socket in the hammer head. As will be evident, the flange portions 38 will most effectively receive and transmit to the hammer blows; however, additional force may be delivered if the top end of the tang portion comes into contact with a wall that defines the inner end of a hammer head socket.

Needless to say, the flange portions 38 also serve to reinforce and strengthen the stake panels 30 and, when the stake 16 is driven home, to provide good contact with the areas of the base wall 14 adjacent the structure that defines the V-shaped apertures 12, and thus providing effective hold-down force. It also goes without saying that the large surface areas presented by the panels 30 afford a high level of frictional engagement with the medium of the substrate S into which the stake 10 is driven, thereby optimizing its holding power.

The upstanding lateral walls of the edging member engages the sides of a proximate course of paving blocks, landscaping, covering material, etc., to provide restraint against lateral shifting or spreading movement due to pedestrian and/or vehicular traffic and other effects to which the deposit may be subjected. It should perhaps be emphasized that the depicted orientation of the V-shaped apertures in the base wall, with their vertices proximate the upstanding wall, maximizes the resistance of the stakes to forces generated by outward lateral movement of the material of the substrate, allowing the material to migrate along the outer surfaces of the panels rather than being trapped within the interior of the stake. However, the reverse orientation, and alternating and varying orientations of a multiplicity of apertures along the length of an edging member, may be employed as desired or appropriate.

Turning now in detail to FIGS. 7 through 10 of the drawings, therein illustrated is a second form of edging member embodying the present invention. The member, generally designated by the numeral 40, differs essentially from edging member 10 described with reference to FIGS. 1 through 5 in being particularly suited for fabrication from a metal (e.g., aluminum).

Figures 7, 8:
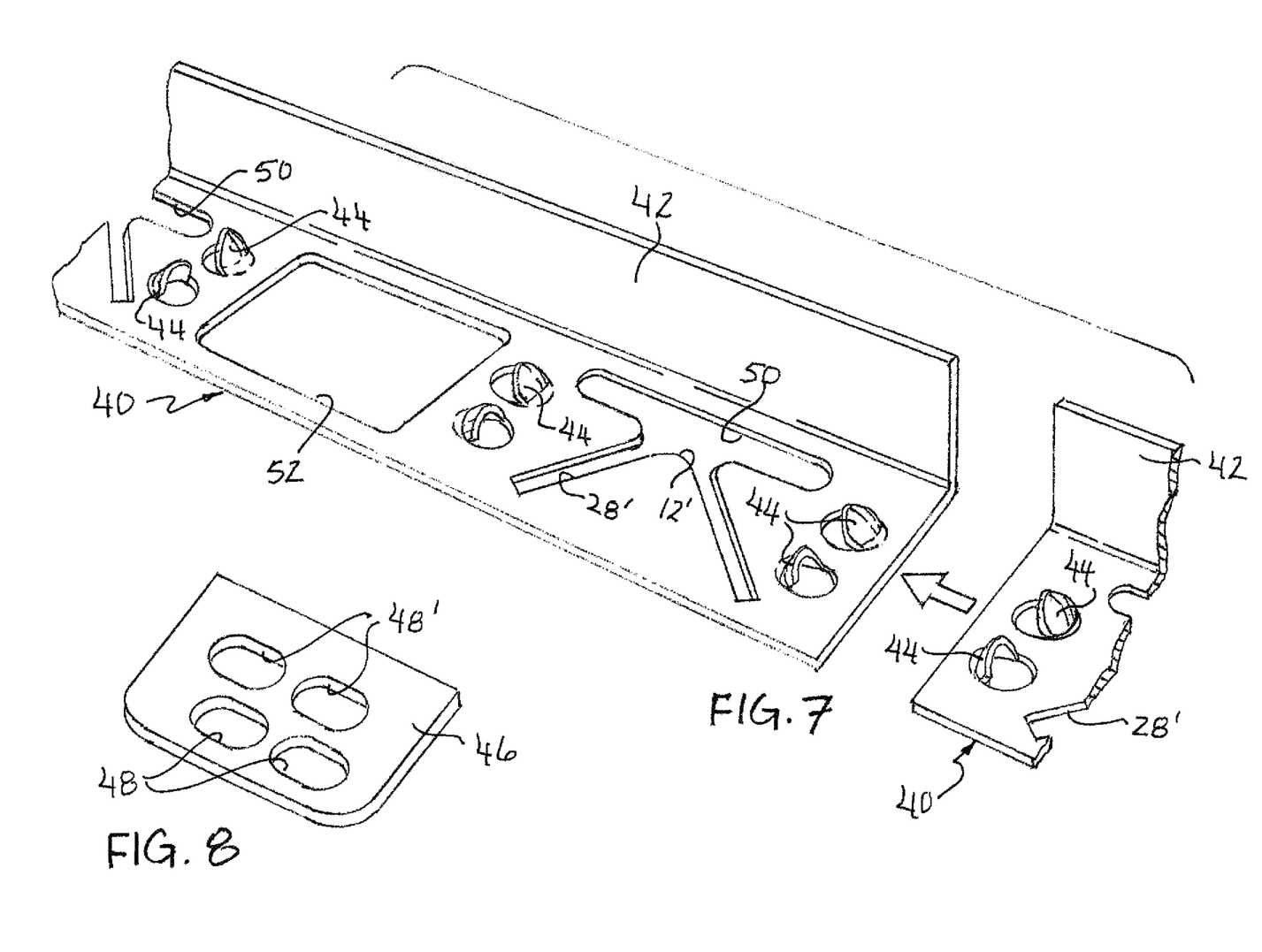
FIG. 7 is a fragmentary orthographic view of two edging members comprising a second embodiment of the present invention, in the process of endwise assembly.
FIG. 8 is an orthographic view of a coupling piece in the form of a link, used for endwise joining of the edging members of FIG. 7.

Apart from the simplicity of the plain upstanding lateral wall 42, a primary distinguishing feature of the member 40 resides in the bore-defining structures 44, constituting small arch-like tab elements formed from areas of metal partially severed and upwardly deformed out of the plane of the base wall 46. In a manner that is functionally equivalent to the bore-defining bosses of the member 10, the side-by-side pairs of slightly staggered tab elements 44 effectively define oppositely directed bores for receiving and orienting spikes 22 in a laterally offset, noninterfering relationship to one another. The elements 44 substantially constrain the spikes to the desired effective axis (again, preferably of about 60°), albeit the axes may be less precisely defined by the elements 44 than by the bores of the boss formations 18 of the previously described embodiment. And it should be appreciated that, in any event, the bore angles are approximate and the levels of constraint applied to the spikes need not be high.

Figure 9:
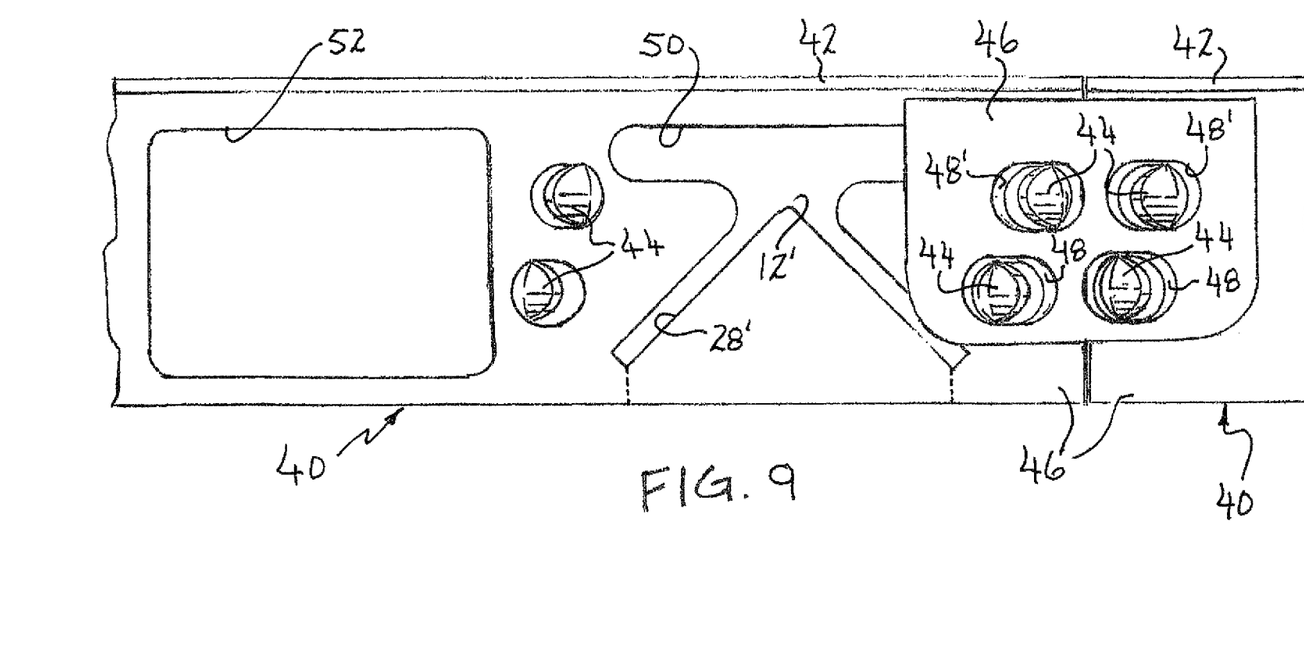
FIG. 9 is a fragmentary plan view of the edging members depicted in FIG. 7, assembled using the coupling piece of FIG. 8.
Figure 10:
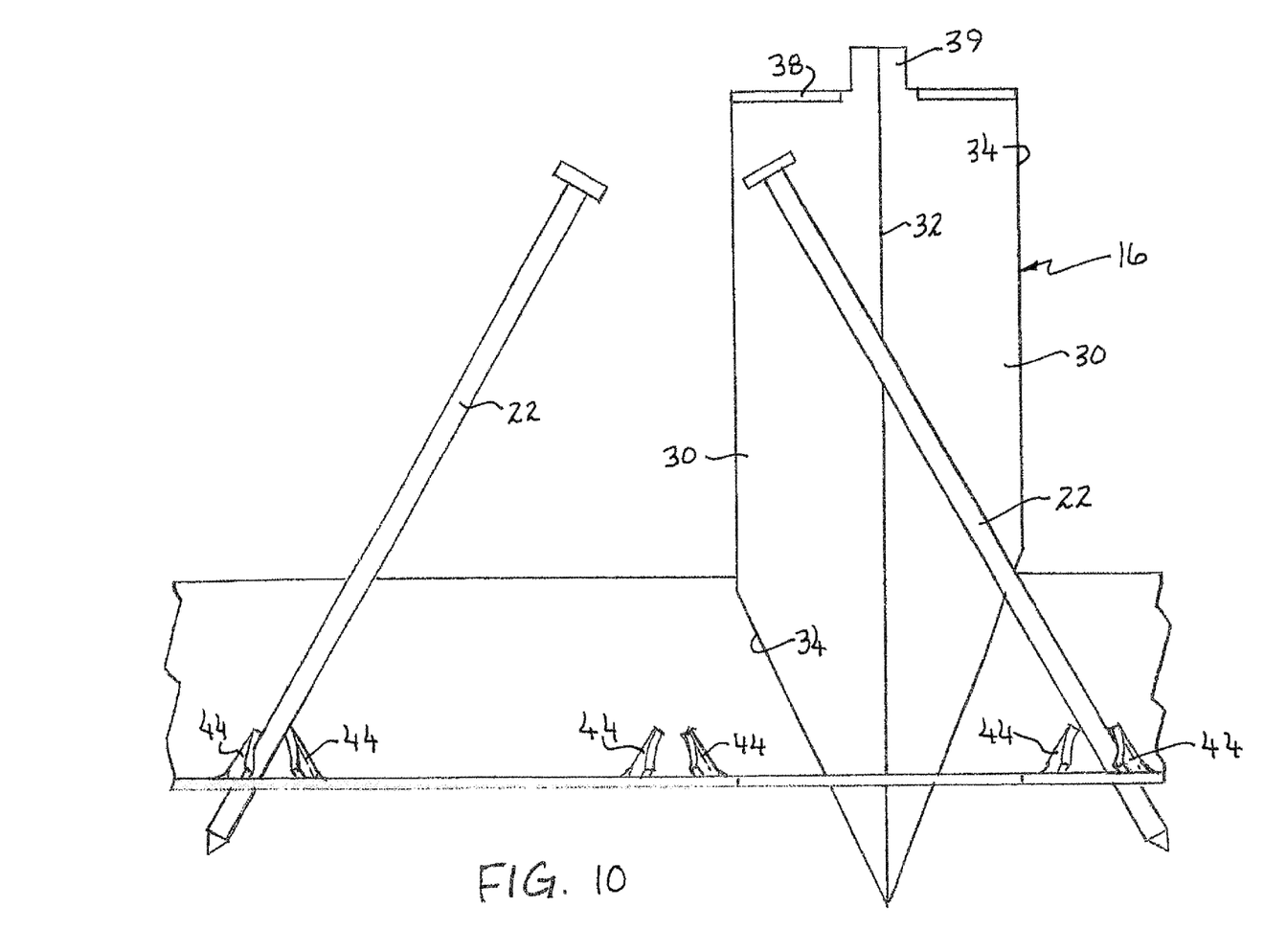
FIG. 10 is a fragmentary elevational view of an edging member depicted in FIGS. 7 and 9, with stakes and spikes positioned for securing the member on a substrate.

Another difference in the embodiment of FIG. 7 resides in the means used for coupling two members 40 in endwise assembly, which may take the form of the coupling plate, or link, 46 depicted in FIGS. 8 and 9. The plate 46 is formed with two pairs of laterally offset, generally oval apertures 48, 48', the pairs being displaced slightly from one another in the longitudinal direction. As seen in FIG. 9, the plate 46 is, in use, simply engaged with the adjacent end portions of two endwise-disposed edging members 40, with the pair of apertures 48 at one end of the plate receiving the arch-like formations 44 on the end portion of one of the edging members 40 and with the pair of apertures 48' at the opposite end of the plate 46 receiving the arch-like formations 44 on the end portion of the other member 40. The generally V-shaped apertures 12' formed in the base wall 46 of the member 40 receive stakes 16, just as in the edging member 10.

It will be appreciated that the triangular portions defining one side (distal from the wall 42) of the generally V-shaped apertures 12' may be cut away (for example, at the dotted line locations designated in FIG. 9) to enable or facilitate bending of the edging member 40, to facilitate conformation to angles and curves defining an edge of a landscaping, paver, etc. installation. The long rectangular openings 50 proximate the upstanding wall 42 (constituting part of the generally V-shaped apertures, and connecting the slots 28') also facilitate bending, and the short strip of material defining the distal lateral edge of the generally square opening 52 may be severed to permit relative movement, as well.

Figures 11, 12, 13:
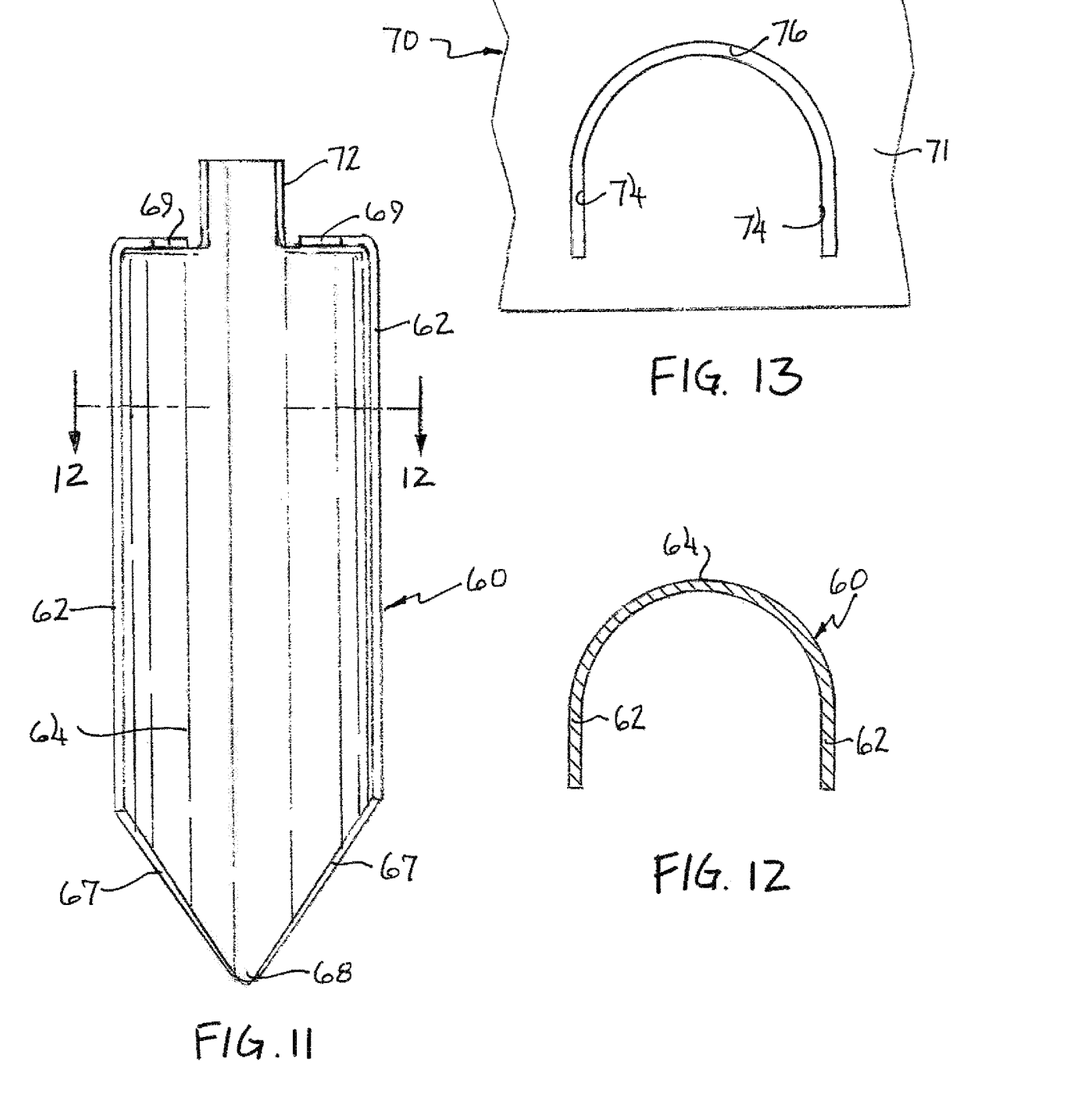
FIG. 11 is a front elevational view of a U-shaped stake suitable for use in the system and arrangement of the invention
FIG. 12 is a sectional view of the stake of FIG. 11, taken along line 12-12 therein.
FIG. 13 is a fragmentary plan view or a short section of an edging member embodying the invention, taken along the length thereof and having a U-shaped aperture therethrough for receiving a U-shaped stake.

Turning now more particularly to FIGS. 11 through 13, therein illustrated is a stake of U-shaped cross section, generally designated by the numeral 60, and, in FIG. 13, a section of an edging member, generally designated by the numeral 70, formed with a U-shaped aperture. As seen in FIGS. 11 and 12, the stake 60 is comprised of two planar panels 62, joined by a semi-cylindrical section 64, which effectively defines a longitudinal axis of the stake. A bottom portion of the stake 60 has lateral edges 67 which converge to a tip 68 lying on the axial centerline of the stake, about which the stake is symmetrical, and it has inwardly extending coplanar flange portions 69 and a tang portion 72 comparable to the portions 38 and 39 of the V-shaped stake 16, previously described.

The U-shaped aperture in the base wall 71 of the member 70 is comprised of parallel rectilinear slot elements 74 joined by a semicircular slot element 76. Obviously, the U-shaped aperture is dimensioned and configured to receive the stake 60 driven through it, to secure the edging member against a substrate. Other features hereinabove described with respect to the edging members 10 and 40 may be incorporated into and comprise the edging member 70, as will be evident to those skilled in the art, and it will be appreciated that U-shaped stakes and apertures will function comparably to those of V-shaped construction and configuration.

Many variations may be of course made in and to the edging members, system, and arrangement described herein without departure from the scope of the appended claims. Details of the form and construction of the components may vary in ways that will be apparent to those of ordinary skill in the art. Albeit the edging members will typically be provided in eight-foot lengths, and with a 2½ inch wide base wall and a 1¾ inch high lateral wall, the members may be of substantially different dimensions. Spikes and stakes will typically be about 8 to 12 inches long, and the panels comprising an stake will typically be about two inches wide, but the holding members may of course have any dimensions that are deemed appropriate for a given application. As has been indicated, the slots forming V-shaped apertures will usually be connected to one another at a vertex (defined or projected), but if material is present between the ends of adjacent slots the force of a driven stake may serve to penetrate the material (indeed, the same technique may be used if slots do not extend entirely through the thickness of the base wall, as they may not). While the illustrated embodiments describe and depict the stakes as being comprised of planar walls and semi-cylindrical sections, and the apertures in the base wall as being comprised of rectilinear and circular slots and sections, it should be appreciated that some curvature and other deviations (e.g., from true parallelism) may be present in these features of the generally V-shaped and generally U-shaped stakes and apertures recited in the appended claims. The coupling means used for endwise joining the edging members may also take forms other than those described.

Thus, it can be seen that the present invention provides a novel edging member, system, and arrangement for retaining or restraining installations of landscaping, covering, paving materials, and the like. The system and arrangement are comprised of one or a plurality of edging members, respectively, and a multiplicity of substrate-engaging holding members for securement of the edging member or members against both vertical and lateral displacement. The edging system and arrangement are relatively facile to install, and highly effective for their intended use.

Having thus described the invention, what is claimed is:

1. An edging system for use in an arrangement for retaining or restraining a landscaping, covering, or paving material against lateral displacement, including: an elongate edging member comprised of a generally planar base wall having opposite, longitudinally extending lateral edges, and lateral wall that extends upwardly along one of said lateral edges of said base wall along substantially the entire length of said base wall; and a multiplicity of holding members for cooperatively securing said edging member upon a substrate underlying said base wall; said base wall of said edging member having a plurality of bore-defining structures defining a multiplicity of angularly oriented bores through said base wall at spaced locations along the length of said edging member, each of said bores having an effective axis lying substantially in at least one plane that is perpendicular to the plane of said base wall and between said lateral edges thereof, and extending generally parallel to said lateral wall and at an acute angle to said plane of said base wall, the acute angle of the axes of a first plurality of said bores being taken in a first arcuate direction relative to said plane of said base wall, and the acute angle of the axes of a second plurality of said bores being taken in a second arcuate direction, opposite to said first arcuate direction, relative to said plane of said base wall; said base wall of said edging member having a plurality of generally V-shaped or generally U-shaped apertures therethrough at mutually spaced locations along the length of said edging member; a first plurality of said holding members comprising spikes that are dimensioned and configured for being driven individually through said bores of said bore-defining structures into a substrate, and to engage said bore-defining structures, for cooperatively securing said edging member in place upon the substrate; and a second plurality of said holding members comprising stakes that are dimensioned and configured to be driven through either said generally V-shaped or said generally U-shaped apertures of said base wall into a substrate, and to engage portions of said base wall that define said apertures, for cooperatively securing said edging member in place on an underlying substrate.

2. The system of claim 1 wherein said acute angle has a value of 45° to 75°.

3. The system of claim 2 wherein said edging member is of right angular cross section, wherein said lateral wall is generally planar, and wherein said effective axes of said first plurality of said bores lie substantially on a first plane that is perpendicular to said plane of said base wall and between said lateral edges thereof, and wherein said effective axes of said second plurality of bores lie substantially on a second plane, offset laterally from said first plane, that is perpendicular to said plane of said base wall and between said lateral edges thereof.

4. The system of claim 1 wherein said generally V-shaped apertures comprise rectilinear slot elements that are disposed at an angle of about 45° to 135° to one another and that converge toward a vertex, and wherein said stakes comprise panels that are disposed with an internal angle that is substantially the same as the angle between said slot elements of said generally V-shaped apertures through said base wall of said edging, member.

5. The system of claim 4 wherein said slot elements of which each of said generally V-shaped apertures is comprised are disposed at an angle of about 90° to one another, and wherein the vertices of said generally V-shaped apertures are proximate said lateral wall of said edging member.

6. The system of claim 1 wherein said generally U-shaped apertures comprise rectilinear slot elements that are disposed substantially parallel to one another, and a curvilinear slot element between said rectilinear slot elements and connecting ends thereof.

7. The system of claim 1 wherein said stakes are constructed for being driven lengthwise through said generally V-shaped or generally U-shaped apertures in said base wall of said edging member; each of said stakes having a top, a bottom, and opposite lateral edges extending substantially along the entire length of said each stake, and being comprised of two generally planar panels effectively joined along a common rectilinear longitudinal axis, each of said panels providing one of said opposite lateral edges on said each stake, said lateral edges of said panels converging, at least along a lower portion of said each stake, to form a tip on the common longitudinal axis at said bottom thereof, said each stake being substantially symmetrical about its longitudinal axis.

8. The system of claim 7 wherein each of said panels comprising said each stake has a flange portion at said top of said each stake spaced from said longitudinal axis, said flange portions extending inwardly of said each stake and being disposed substantially in a common plane that is generally perpendicular to the planes of said panels, and said each stake having a tang portion extending on said longitudinal axis upwardly beyond said flange portions thereof.

9. The system of claim 1 wherein said edging member has first and second opposite end portions, said first opposite end portion having first coupling means thereon and said second opposite end portion having second coupling means thereon structurally complimentary to said first coupling means, said first coupling means being constructed to mate with and secure second such coupling means on a separate, endwise-arranged edging member of like construction to said edging member, and said second coupling means being constructed to mate with and be secured by a first such coupling means on a separate, endwise-arranged edging member of like construction to said edging member, whereby said edging member may be assembled with and secured to a separate, like edging member in endwise relationship.

10. The system of claim 9 wherein said first coupling means comprises a said bore-defining structure.

11. The system of claim 10 wherein said second coupling means comprises a socket that is constructed to engage a said first coupling means.

12. The system of claim 11 wherein said edging member is fabricated from a synthetic resinous material.

13. The system of claim 1 wherein said edging member has first and second opposite end portions, each of said end portions having said bore-defining structure thereon, and wherein said system additionally includes a coupling piece, said coupling piece being constructed to engage, separately, said bore-defining structure on each of said opposite end portions of said edging member, whereby said coupling piece can secure said edging member to a separate, endwise-arranged edging member of like construction to said edging member.

14. The system of claim 13 wherein said edging member is fabricated from a metal, and wherein said bore-defining structures comprise areas upwardly deformed from said base wall of said edging member.

15. An elongate edging member for use in a system and arrangement for retaining or restraining landscaping, covering, or paving material against lateral displacement, comprising a generally planar base wall having opposite longitudinally extending lateral edges, and a lateral wall that extends upwardly along one of said lateral edges of said base wall along substantially the entire length of said base wall; said base wall of said edging member having a plurality of bore-defining structures defining a multiplicity of angularly oriented bores through said base wall at spaced locations along the length of said edging member, each of said bores having an effective axis lying substantially in at least one plane that is perpendicular to the plane of said base wall and between said lateral, edges thereof and at an acute angle to an axis perpendicular to said plane of said base wall, said acute angle of said effective axes of a first plurality of said bores being taken in a first arcuate direction relative to said plane of said base wall, and said acute angle of said effective axes of a second plurality of said bores being taken in a second arcuate direction, opposite to said first arcuate direction, relative to said plane of said base wall; said edging member being of right angular cross section; said lateral wall being generally planar; said axes of said first plurality of said bores lying substantially on a first said at least one plane that is between said lateral edges of said base wall; and said axes of said second plurality of bores lying substantially on a second said at least one plane, offset, laterally from said first said at least one plane, that is perpendicular to said plane of said base wall and between said lateral edges of said base wall.

16. An elongate edging member for use in a system and arrangement for retaining or restraining landscaping, covering, or paving material against lateral displacement, comprising a generally planar base wall having opposite longitudinally extending lateral edges, and a lateral wall that extends upwardly along one of said lateral edges of said base wall along substantially the entire length of said base wall; said base wall of said edging member having a plurality of bore-defining structures defining a multiplicity of angularly oriented bores through said base wall at spaced locations along the length of said edging member, each of said bores having an effective axis lying substantially in at least one plane that is perpendicular to the plane of said base wall and between said lateral edges thereof and at an acute angle to an axis perpendicular to said plane of said base wall, said acute angle of said effective axes of a first plurality of said bores being taken in a first arcuate direction relative to said plane of said base wall, and said acute angle of said effective axes of a second plurality of said bores being taken in a second arcuate direction, opposite to said first arcuate direction, relative to said plane of said base wall; said base wall additionally having a plurality of generally V-shaped or generally U-shaped apertures therethrough at spaced locations along the length of said edging member.

17. An arrangement for retaining or restraining a landscaping, covering, or paving material against lateral displacement, comprising a plurality of said elongate edging members of claim 16 arranged and secured in endwise relationship to one another, each of said edging members having opposite end portions with a said bore-defining structure thereon, said bore-defining structure on an end portion of a first one of said edging members cooperating with said bore-defining structure on an adjacent end portion of a second one of said edging members for securing said first and second edging members in endwise assembly.

18. The arrangement of claim 17 additionally including a coupling piece that is constructed for engaging said bore-defining structures on said adjacent end portions of said first and second edging members, and for thereby securing them in assembly.

* * * * *